(12) United States Patent  (10) Patent No.: US 7,481,638 B1
Burg  (45) Date of Patent: Jan. 27, 2009

(54) EXTRUDING TREAD COMPONENTS DIRECTLY INTO A TIRE MOLD

(75) Inventor: Gary Robert Burg, Massillon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/931,103

(22) Filed: Oct. 31, 2007

(51) Int. Cl.
*B29C 35/02* (2006.01)
*B29D 30/52* (2006.01)

(52) U.S. Cl. .......................... 425/28.1; 425/35; 425/38; 425/325; 425/327

(58) Field of Classification Search ................. 425/28.1, 425/35, 38, 325, 327, 219, 46
See application file for complete search history.

(56) References Cited

U.S. PATENT DOCUMENTS

| | | | |
|---|---|---|---|
| 3,276,930 A * | 10/1966 | Keefe, Jr. ....................... | 425/46 |
| 3,974,018 A * | 8/1976 | Arimura et al. ................ | 425/46 |
| 4,309,161 A | 1/1982 | Krebs et al. | |
| 4,316,710 A | 2/1982 | Greenwood | |
| 4,597,728 A * | 7/1986 | McGlashen ................... | 425/43 |
| 4,738,738 A | 4/1988 | Holroyd et al. | |
| 4,743,322 A * | 5/1988 | Holroyd et al. ............... | 425/47 |
| 4,895,502 A | 1/1990 | Beard et al. | |
| 5,062,783 A | 11/1991 | Majerus et al. | |
| 5,104,600 A * | 4/1992 | Remond ....................... | 425/31 |
| 5,290,376 A * | 3/1994 | Siegenthaler ................ | 156/129 |
| 5,320,695 A * | 6/1994 | Siegenthaler ................ | 156/127 |
| 5,836,680 A | 11/1998 | Banas et al. | |
| 6,887,062 B1 | 5/2005 | Burg et al. | |
| 6,955,782 B1 | 10/2005 | Ratliff, Jr. | |
| 6,964,719 B1 | 11/2005 | Van Hoose | |
| 7,040,870 B2 | 5/2006 | Nicolas et al. | |
| 7,341,640 B2 * | 3/2008 | Kudo et al. ................... | 156/117 |
| 2005/0220919 A1 | 10/2005 | Fischer et al. | |

FOREIGN PATENT DOCUMENTS

GB 2 133 357 1/1984

* cited by examiner

*Primary Examiner*—James Mackey
(74) *Attorney, Agent, or Firm*—Roger D. Emerson; Daniel A. Thomson; Emerson, Thomson & Bennett, LLC (57) ABSTRACT

A method may include the steps of: (a) providing a tire mold; (b) providing an extruder operatively connected to a head with a die assembly; (c) inserting at least a first compound into the first extruder; (d) forming an extrudate from the die assembly; (e) applying the extrudate directly from the die assembly into the tire mold to form a tire tread component; and, (f) controlling movement of the tire mold to correspond to the extrudate delivery.

9 Claims, 7 Drawing Sheets

EXTRUDING TREAD COMPONENTS DIRECTLY INTO A TIRE MOLD

I. BACKGROUND OF THE INVENTION

A. Field of Invention

This invention pertains to the art of methods and apparatuses regarding the manufacture of tires, and more particularly to methods and apparatuses regarding the application of tire tread components directly from an extruder/gear pump into a tire mold.

B. Description of the Related Art

Conventionally, tires are made by first assembling a tire carcass on a flat drum. The drum is then expanded to place the carcass into the required toroidal shape. Separately, a tread is formed, typically using an extruder, and a belt package is made. The belt package is placed over the carcass and the tread is subsequently placed over the belt package. This creates an unvulcanized or "green" tire. The green tire is then placed into a tire mold where internal pressure is used to push the green tire against the mold, forcing the tread into the specific mold pattern. After sufficient time and temperature within the mold, the green tire becomes vulcanized, or cured. While such conventional tire making processes work well for their intended purposes, they have disadvantages.

One disadvantage is related to the well known fact that tires are generally assembled from many separate components. In order to maintain high quality for tires, each of these components must be precisely located and accurately shaped within the completed tire. Maintaining the required shapes and obtaining sufficient accuracy in the positions of the components is extremely difficult in practice because of the readily deformable nature of the unvulcanized material that is used and because of the conventional gross changes in shape which are impressed on the tire during assembly. What is needed, then, is an improved way to position tire components to minimize these disadvantages.

II. SUMMARY OF THE INVENTION

According to one embodiment of this invention, a method comprises the steps of: providing a tire mold; providing a first extruder operatively connected to a head with a die assembly; inserting at least a first compound into the first extruder; forming a first extrudate from the die assembly; applying the first extrudate directly from the die assembly into the tire mold to form a tire tread component; and, controlling movement of the tire mold to correspond to the first extrudate delivery.

According to another embodiment of this invention, the step of controlling movement of the tire mold to correspond to the first extrudate delivery, comprises the step of rotating the tire mold corresponding to the first extrudate delivery.

According to another embodiment of this invention, a tire tread component is formed in one revolution of the tire mold.

According to another embodiment of this invention, a tire tread component is formed with more than one revolution of the tire mold.

According to another embodiment of this invention, the extrudate is spread onto the tire mold with a spread surface.

According to yet another embodiment of this invention, an assembly comprises: a tire mold; a first extruder operatively connected to a head with a die assembly, the head positioned juxtaposed to the first tire mold so that a first extrudate from the head is directly applied into the tire mold to form a tire tread component; a rotation device for use in rotating the first tire mold; and, a control system for use in controlling rotation of the tire mold to correspond to the first extrudate delivery.

According to another embodiment of this invention, the extruder comprises a gear pump.

According to another embodiment of this invention, the extruder comprises an extrudate size adjustment mechanism that can be used to adjust the size of an opening through which the extrudate exits the head.

According to another embodiment of this invention, the assembly also comprises a nozzle connected to the head for use in applying the first extrudate at a width less than the tread width.

One advantage of this invention is that a tire tread can be applied directly to a tire mold eliminating the need to expand or stretch the tread into the mold.

Another advantage of this invention, in one embodiment, is that by adjusting the size of the extrudate opening, the head can be used to apply multiple tread components to multiple tire molds.

Another advantage of this invention, in another embodiment, is that extrudate can be directly applied to a tire mold as a laminate that is gradually built up, layer upon layer or layer beside layer until the tire component is fully applied to the tire mold.

Still another advantage of this invention, according to another embodiment, is that a precise amount of extrudate can be delivered using a gear pump at a predetermined speed that corresponds to the rotational speed of the tire mold.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
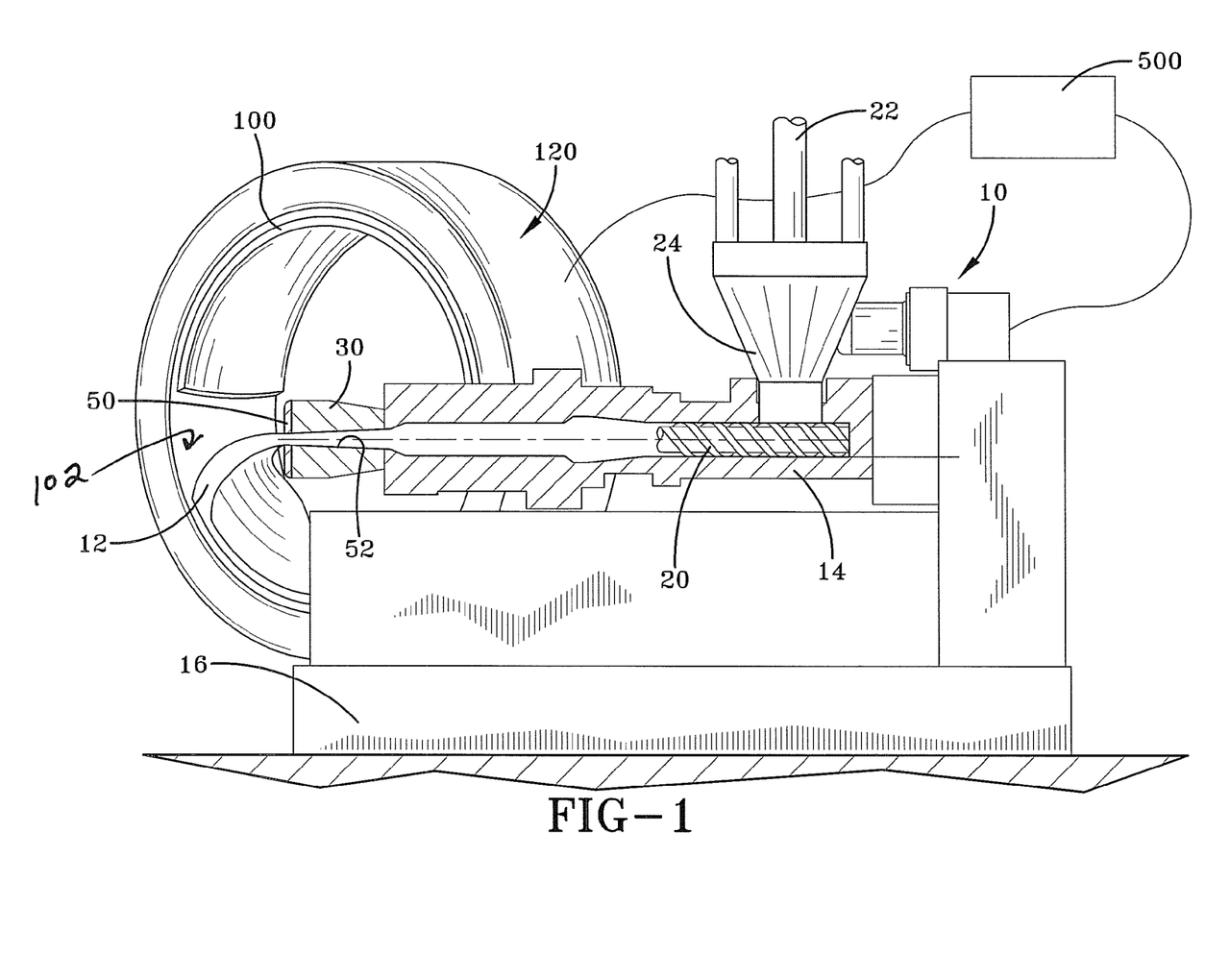
FIG. 1 is a schematic representation of an extruder assembly, according to one embodiment of this invention, applying a tread compound directly to a tire mold.

Referring now to the drawings wherein the showings are for purposes of illustrating embodiments of the invention only and not for purposes of limiting the same, FIG. 1 shows an extruder assembly 10 applying an extrudate 12 directly to a tire mold 100. By "directly" it is meant that the extrudate moves non-stop, without being stored, out of the extruder assembly 10 and into the tire mold 100. More specifically, the extruder assembly 10 shown is applying a tread extrudate 12 directly against or into the tread forming portion 102 of the mold 100. A tire is thus being built from the outside in to form a very low tension tire. By placing the tread extrudate 12 directly into the mold 100 no expansion or stretching of the tread extrudate 12 is required. The resulting tire thus has very good uniformity.

With continuing reference to FIG. 1, the extruder assembly 10 may include a housing 14 supported on a base 16. Within the housing 16 a screw 20 may be used to masticate and move a compound 22, which may be an elastomeric compound such as rubber. The compound 22 may be fed into a feed chute 24 by which it contacts the screw 20 and is thereby moved as the screw 20 rotates. The compound may then enter and flow through a flow channel 52 formed in a head 30 and then through a die assembly 50 to create the extrudate 12. It should be noted that this invention will work with any type of extruder assembly that delivers the extrudate 12 directly into the tire mold 100. In another embodiment, two or more extruder assemblies can be used. It is well known, for example, to use duplex or triplex extruders that feed the same head 30. This provides a convenient way to extrude multiple compounds into a single extrudate 12, such as a tread extrudate comprising a tread base formed of one compound and a tread cap formed of another compound.

Figure 2:
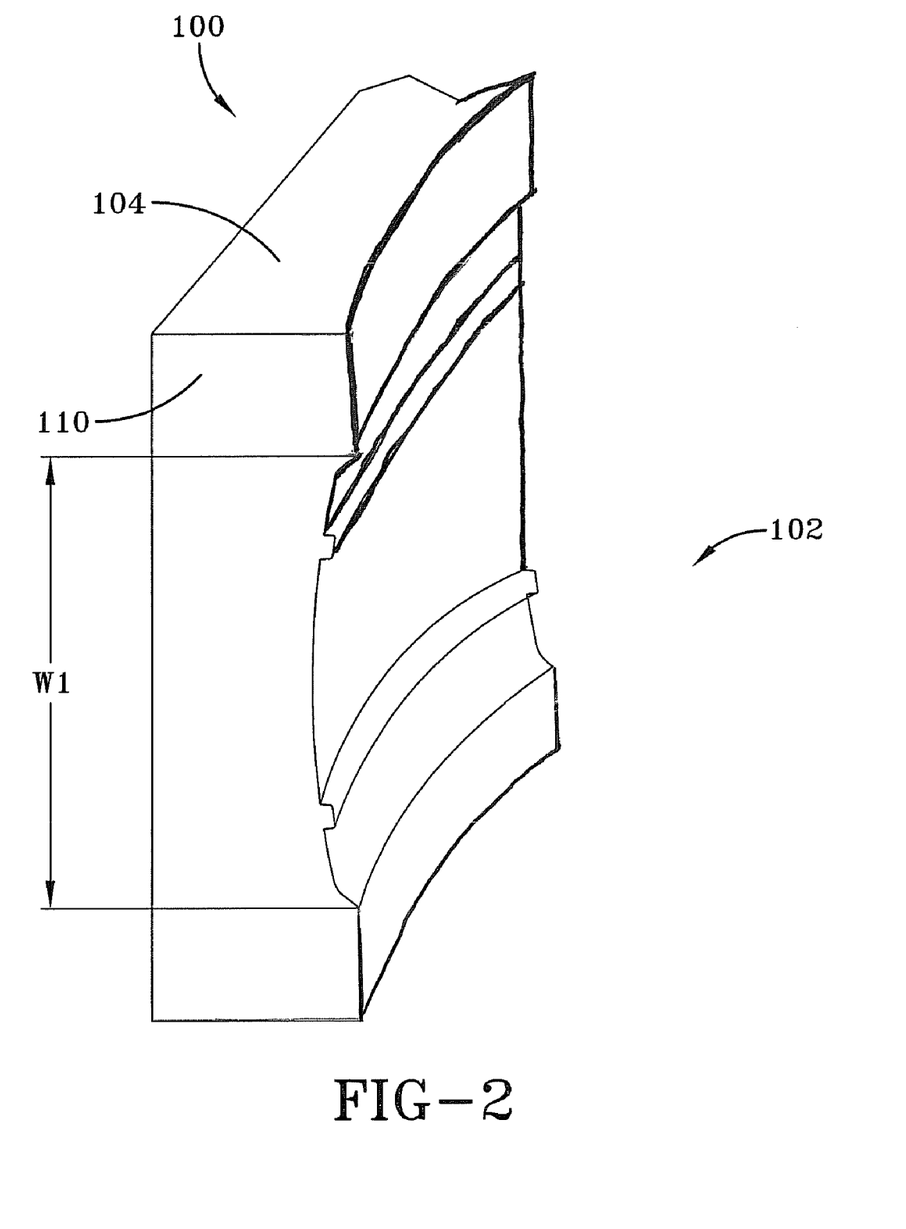
FIG. 2 is cross-sectional view of a tire mold.
Figure 3:
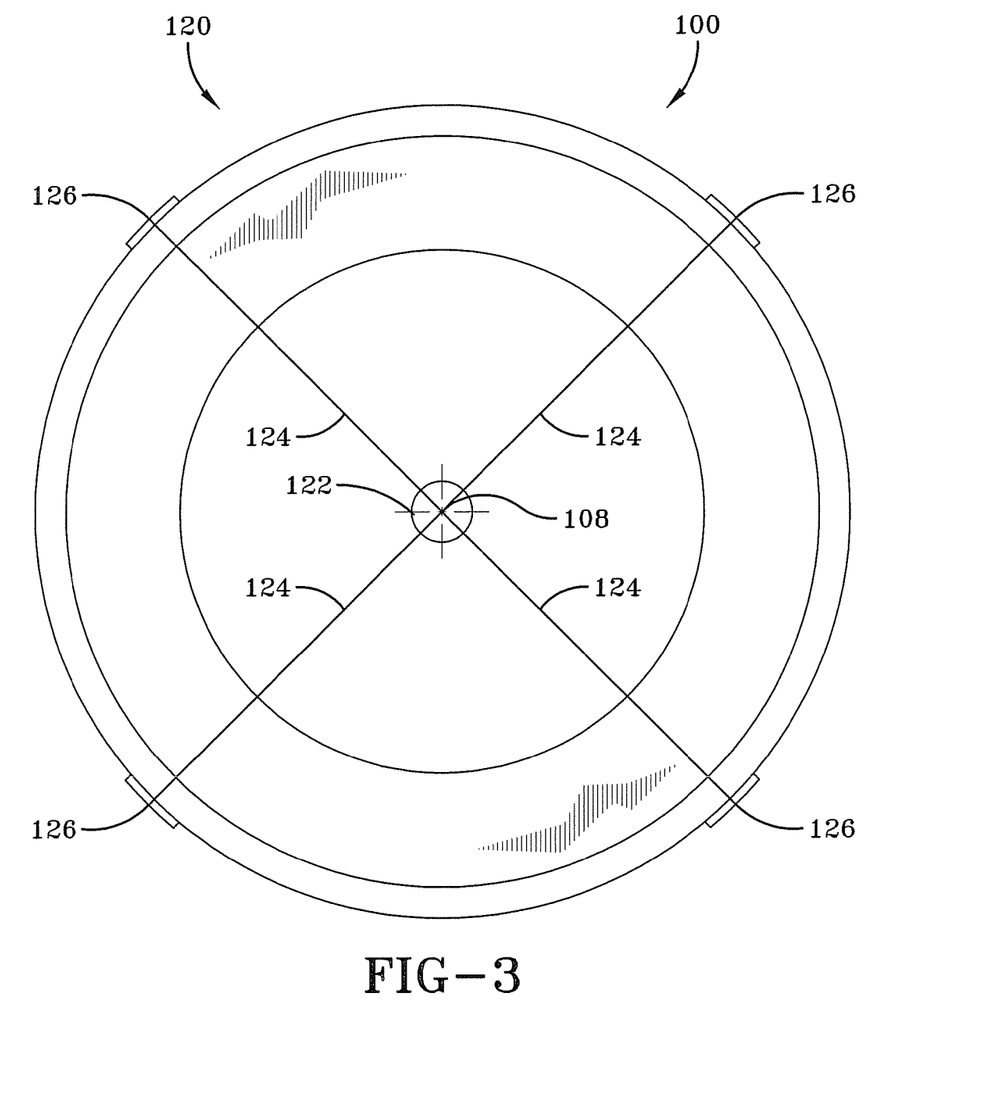
FIG. 3 is a schematic representation of one embodiment rotation device for use in rotating a tire mold.
Figure 4:
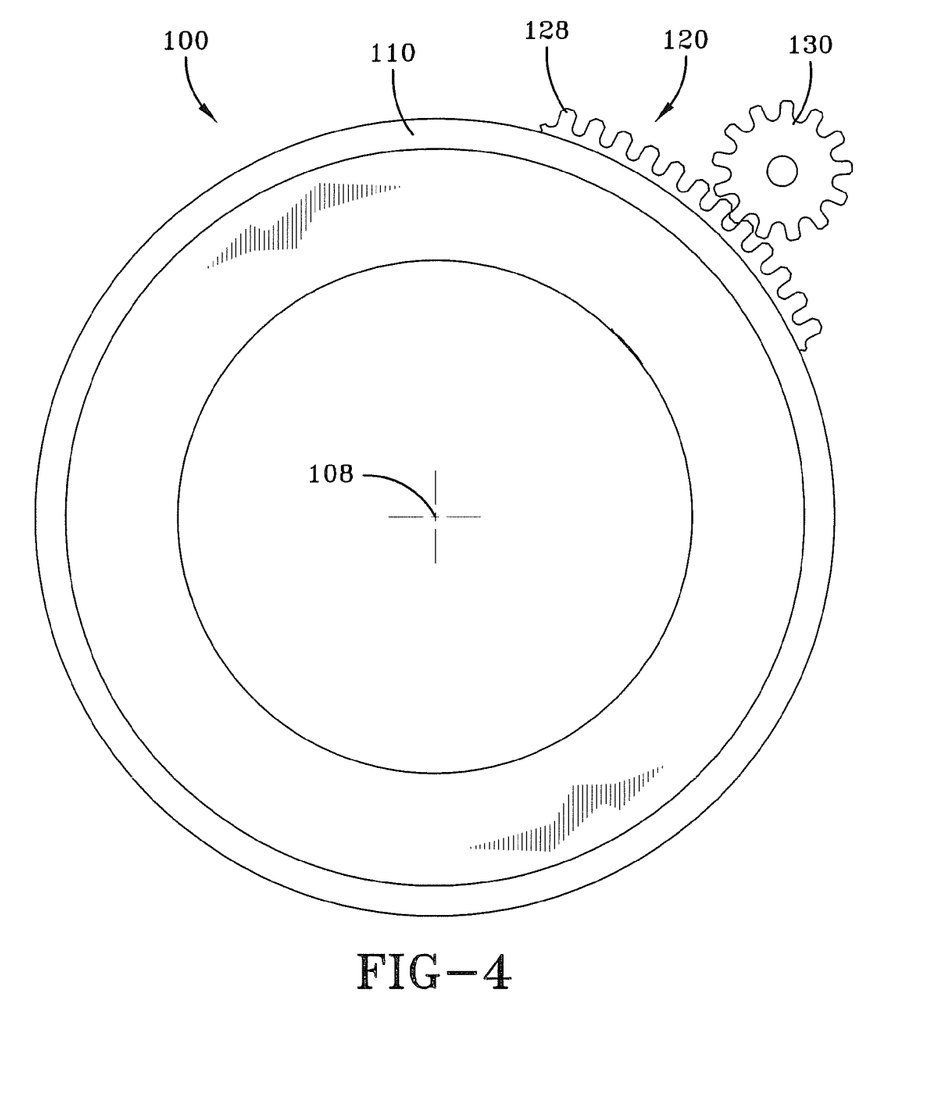
FIG. 4 is a schematic representation of another embodiment rotation device for use in rotating a tire mold.

With reference now to FIGS. 1-4, this invention will work well with any type of tire mold chosen with sound engineering judgment. In one embodiment, shown, the tire mold 100 is a segmented tire mold having multiple radially movable tread forming segments 104 that when closed form an annular tread ring 110 having a tread ring width W1. The tread ring 110 provides the tread forming portion 102 of the tire mold 100. The operation of a segmented mold as well as other types of molds is well known and thus will not be described in detail. It should be noted that this invention will work well with any orientation of the tire mold 100 including but not limited to placing the mold 100 so that the central axis 108 is substantially parallel to a ground surface, as shown in FIG. 1, or placing the mold 100 so that the central axis 108 is substantially perpendicular to a ground surface, as shown in FIGS. 3-4.

With continuing reference to FIGS. 1-4, a rotation device 120 of any type chosen with sound engineering judgment may be used to rotate the tire mold 100 and/or the tread ring 110 for purposes to be discussed further below. In one embodiment, shown in FIG. 3, the rotation device 120 comprises a hub 122 having multiple arms 124. The hub 122 may be positioned near the central axis 108 of the tire mold 100. The radial distal ends of the arms 124 may have gripping portions 126 that are secured to the radially outer surface of the tire mold 100. To rotate the mold 100, it is only necessary to attach the rotation device 120 to the tire mold 100 and then rotate the hub 122 in any manner chosen with sound engineering judgment. In another embodiment, shown in FIG. 4, the rotation device 120 comprises a gear ring 128 formed on or placed on the radially outer surface of the tire mold 100. Only a segment of the gear ring 128 is shown in FIG. 4 but it is to be understood that the gear ring 128 may extend substantially around the periphery of the tire mold 100. A pinion gear 130 having gear teeth that engage the gear teeth on the gear ring 128, can be rotated in any manner chosen with sound engineering judgment to thereby rotate the tire mold 100. It is to be understood that the rotation devices 120 shown in FIGS. 3 and 4 are illustrative only and that numerous other devices and methods of rotating the tire mold 100 are possible with this invention.

Figure 5:
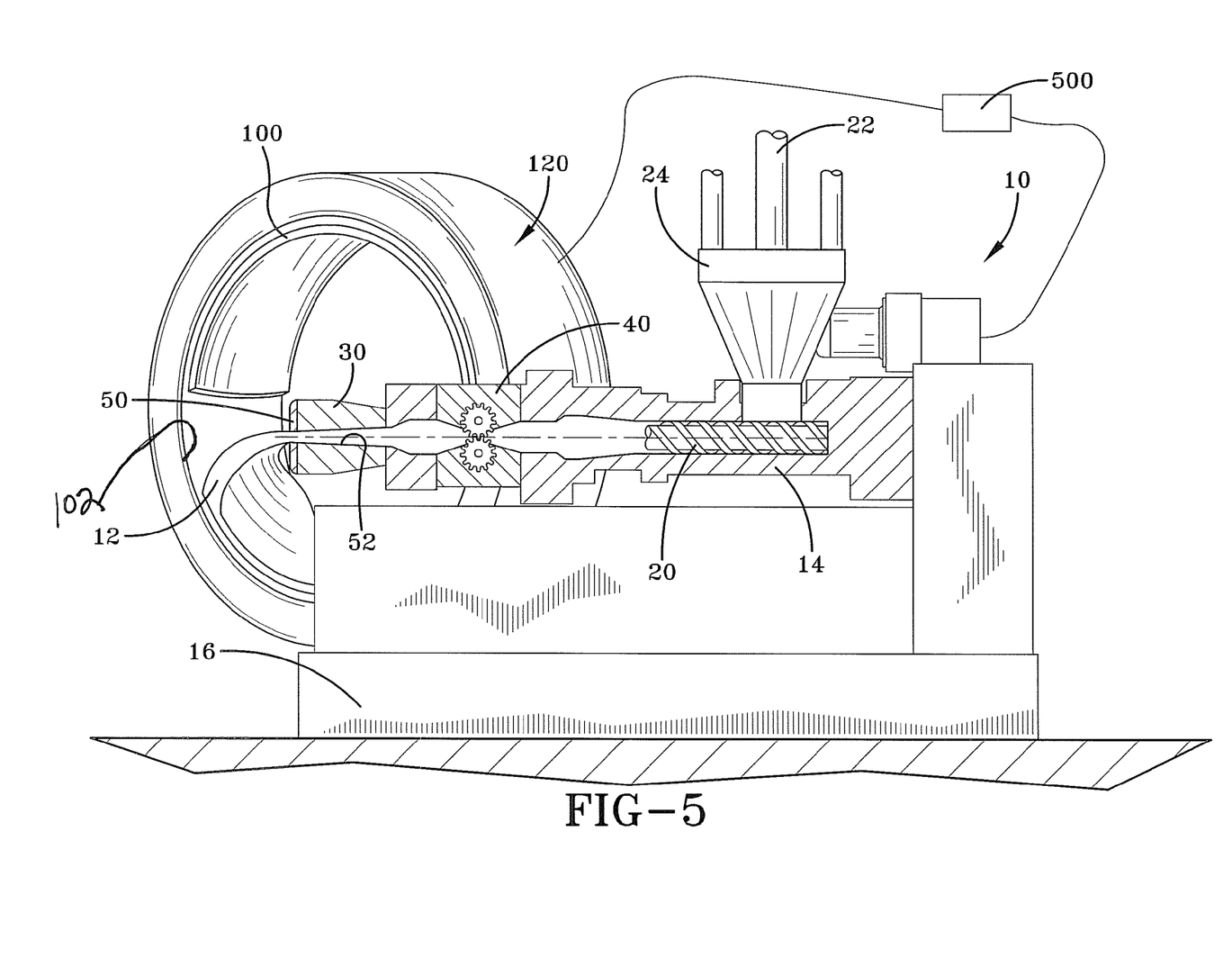
FIG. 5 is a schematic representation similar to that shown in FIG. 1 but including a gear pump.

With reference now to FIG. 5, in yet another embodiment, the extruder assembly 10 includes an integrated gear pump 40. The gear pump 40 may be positioned as shown between the end of the screw 20 and the head 30. The gear pump 40 delivers a precise amount of extrudate 12 at a predetermined speed as required. The specific gear pump used can be of any type chosen with sound engineering judgment. The gear pump may be, for example, the gear pump described in U.S. Pat. No. 7,040,870 titled GEAR PUMP WITH GEARS HAVING CURVED TEETH AND METHOD OF FEEDING ELASTOMERIC MATERIAL, which is incorporated herein by reference. In another embodiment, the extruder assembly 10 comprises a gear pump that is connected directly to the screw. An example of this type of arrangement is described in Publication No. US 2005/0220919 titled EXTRUDER/GEAR PUMP ASSEMBLY which is incorporated herein by reference.

Figure 6:
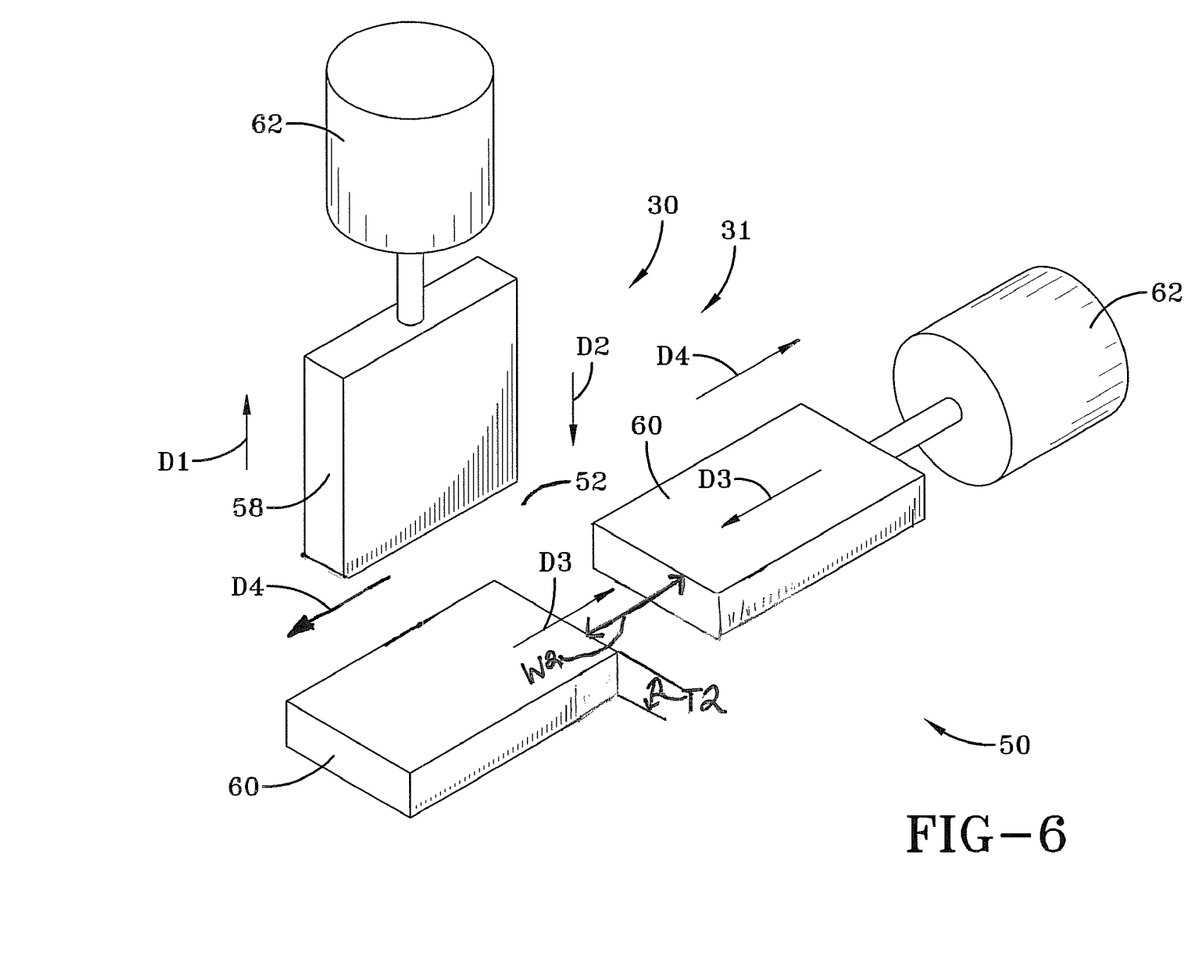
FIG. 6 is a schematic representation of an extrudate size adjustment mechanism.

With reference now to FIGS. 1, 5 and 6, in another embodiment the head 30 may include an extrudate size adjustment mechanism 31 that can be used to adjust the size of the opening through which the extrudate 12 exits the head 30. To adjust the thickness of the extrudate 12 between a minimum of zero and a maximum of T2, the adjustment mechanism 31 may include a thickness plate 58 positioned in the flow channel 52 that may be adjusted in an upward direction D1 and in a downward direction D2. To adjust the width of the extrudate 12 between a minimum of zero and a maximum of W2, the adjustment mechanism 31 may include a pair of width plates 60, 60 positioned in the flow channel 52 that may be adjusted in an inward D3 and an outward direction D4. The thickness plate 58 and the width plates 60, 60 can be position adjusted in any manner chosen with sound engineering judgment such as a mechanical adjustment mechanism. For the embodiment shown, electric motors 62, 62 can be used to adjust the positions of the plates 58, 60, 60. In one embodiment, each width plate 60, 60 can use an individual motor 62. In another embodiment, the width plates 60, 60 can be mechanically linked so that only one motor 60 is required to simultaneously move both plates 60, 60. By using the adjustment mechanism 31 to adjust the size of the opening through which the extrudate 12 exits, the head 30 may provide various sized extrudates for any desired purpose such as for molds having different sized tread forming regions.

Figure 7:
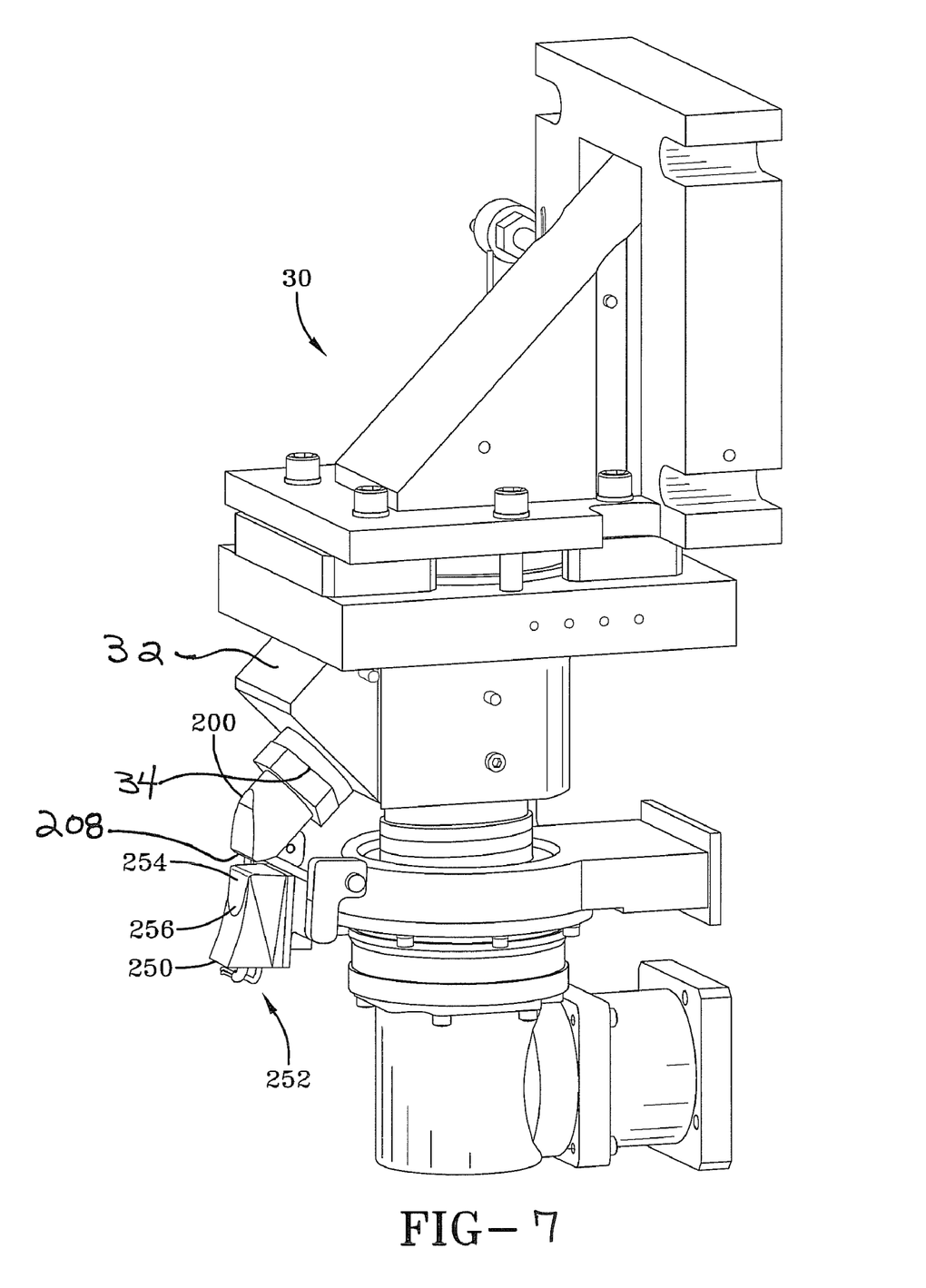
FIG. 7 is a perspective view of a nozzle attached to an extruder assembly head.

With reference now to FIGS. 1 and 7, in another embodiment a nozzle 200 may be attached to the head 30. The nozzle 200 can be of any size and shape chosen with sound engineering judgment and may have a nozzle flow channel that at one end communicates with the flow channel 52 formed in the head 30 and at the opposite end has a nozzle opening 208 where the extrudate 12 can be directly applied to the tire mold 100. The nozzle flow channel can be of any size and shape chosen with sound engineering judgment. In one embodiment, the nozzle flow channel may taper from a substantially circular cross section to a tongue shaped nozzle opening 208. Such a tapered nozzle flow channel provides low pressure, low swell and uniform flow characteristics for the extrudate 12. The nozzle 200 may comprise a spread surface near to the nozzle opening 208 which will be described further below.

With continuing reference to FIGS. 1 and 7, in another embodiment the nozzle 200 may be position adjusted with respect to the head 30 to permit added flexibility in applying the extrudate 12 to the tire mold 100. In a specific embodiment, the head 30 may have a fixed head portion 32 and a rotating head portion 34. The rotating head portion 34 may rotate about a rotation axis along an arc of, for one non-limiting example, 270 degrees to provide easy access to the tire mold 100. It is to be understood that an arc of 270 degrees is illustrative only. The nozzle 200 may be attached to the rotating head portion 34 in any manner chosen with sound engineering judgment. It is also contemplated to rotatably connect the nozzle 200 directly to the head 30 without the use of a rotating head portion.

With reference now to FIG. 7, in another embodiment a roller shoe, not shown but resembling a wheel, may be positioned near the nozzle opening 208. A position cylinder (not shown) may be used to adjust the position of the roller shoe. The cylinder may be pneumatic, hydraulic or of any other type chosen with sound engineering judgment. The outer surface of the roller shoe may be used as a spread surface as will be described further below. The outer surface, in one embodiment, may have a urethane coating for prevent the roller shoe from sticking to the extrudate 12. In another embodiment, a friction shoe 250 may be positioned near the nozzle opening 208, as shown in FIG. 7. The friction shoe 250, in one embodiment, may "float" in that the friction shoe 250 may be movable independent of the nozzle 200. In one specific embodiment, a cylinder (not shown but it may be similar to the position cylinder described above) may be used to permit the function shoe 250 to rest against the extrudate 12 as it is being applied to the tire mold 100 independent of the nozzle 200 position. In another embodiment, a heating mechanism (not shown) may be used to heat the friction shoe 250 to aid in the placement of the extrudate 12. The heating mechanism may be electric, hot water or of any other type chosen with sound engineering judgment. The friction shoe 250, which can have any usable shape, has an outer surface 254 which may be used as a spread surface 256 as will be described further below. In yet another embodiment, both a roller shoe and a friction shoe 250 may be used together. In one embodiment, the shoes can be independently controlled and in another they can be moved together. It is to be understood that the positioning, including relative positioning, of the shoes can be any chosen with sound engineering judgment may be used.

With reference now to FIGS. 1, 5 and 7, a control system 500 may be used to control the operation of the extruder assembly 10, the rotation device 120, the nozzle 200 position, the position and temperature of the shoes etc. The control system 500 can be of any type chosen with sound engineering judgment and may, for example, comprise a microcomputer.

With reference now to FIGS. 1 and 2, in operation, a tire mold 100 which may have a tread ring 110 with a ring width W1 matching the tire to be made is chosen and positioned in proper alignment with respect to the rotation device 120. A compound 22 is then inserted into the extruder assembly 10 which is operated. The control system 500 is used to cause the output of the extruder assembly 10 to correspond with the rotation of the tire mold 100. For the arrangement shown in FIG. 1, in one embodiment, the width and thickness of the extrudate 12 is appropriate to match in one revolution of the tire mold 100, the tire component being applied to the tire mold 100. If the tire component is a tread, for example, the extrudate 12 may include all the rubber used to form the tread and may have a width that matches the width of the tread portion of the tire mold 100, such as the tread ring 110. More specifically a first edge of the extrudate 12 exiting the die assembly 50 is applied to a location on the tire mold 100. The extrudate 12 is then wrapped continuously to the tire mold 100 as the tire mold 100 or tread ring 110 is rotated one revolution. The extrudate 12 is then terminated to define an extrudate strip defining a second edge for the extrudate 12. The second edge of the extrudate 12 is then applied substantially to the same location on the tire mold 100 to form the tread component. In another embodiment, the width and/or thickness of the extrudate 12 may be less than required to form the tire component in one revolution of the tire mold 100. In this case, two or more revolutions of the tire mold 100 may be required to complete the application of the tire component to the tire mold 100 and the extrudate 12 may be considered a laminate that is gradually built up, layer upon layer and/or layer beside layer, until the tire component is fully applied to the tire mold 100. The use of layers in this manner greatly reduces the well known difficulties in splicing together opposite ends of a single component strip. For the arrangement shown in FIG. 5, the operation is similar to that described above regarding FIG. 1 except that the gear pump 40 is used to more precisely deliver an amount of extrudate 12 at a predetermined speed as required. For the arrangement shown in FIG. 6, the operation is similar to that described above regarding FIGS. 1 and 5 except that the size of the opening through which the extrudate 12 exits the head 30 may be adjusted prior to the formation of the extrudate 12.

For the arrangements shown in FIG. 7, the overall operation is similar to that described above regarding FIGS. 1 and 2. However, while it is contemplated to use the nozzle 200 to provide the extrudate 12 with a width and thickness to match in one revolution of the tire mold 100 the tire component being applied to the tire mold 100, the nozzle 200 is especially useful in applying a laminate that is gradually built up, layer upon layer and/or layer beside layer, until the tire component is fully applied to the tire mold 100 as described above. In another embodiment, the nozzle spread surface can be used to spread the extrudate 12 onto the surface of the tire mold 100 (or to the surface of a previously applied layer of extrudate 12) similar to the manner in which a butter knife is used to spread butter onto a piece of bread (though the viscosity of the extrudate may be considerably greater than that of butter). This spreading of the extrudate 12 helps eliminate any air pockets that may otherwise form under the extrudate 12 as it is applied. The roller shoe and friction shoe 250 may provide their own spread surfaces which can be used in addition to or as an alternate to the nozzle spread surface. Advantages to the use of the roller shoe include the ease in rolling over splices and lower drag. Advantages to the use of the heated friction shoe 250 include permitting the nozzle 200 to remain at optimum extrusion temperatures with a relatively shorter length and better spreading characteristics (due to the relatively higher temperature of the spread surface 256). When both shoes are used together, the advantages of each can be combined.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. All assembly comprising:
   a tire mold having a tread width;
   a first extruder operatively connected to a head with a die assembly, the head positioned juxtaposed to the tire mold so that a first extrudate from the head is directly applied into the tire mold to form a tire tread component;
   a rotation device for use in rotating the tire mold; and,
   a control system for use in controlling rotation of the tire mold to correspond to the first extrudate delivery.

2. The assembly of claim 1 wherein:
   the first extruder comprises a gear pump; and,
   wherein the control system causes the first extruder to deliver a precise amount of the first extrudate using the gear pump at a predetermined speed that corresponds to the rotational speed of the tire mold.

3. The assembly of claim 1 further comprising:
an extrudate size adjustment mechanism that can be used to adjust the size of an opening though which the extrudate exits the head.

4. The assembly of claim 1 further comprising:
a nozzle connected to the head for use in applying the first extrudate at a width less than the tread width.

5. The assembly of claim 4 wherein the nozzle comprises a spread surface for use in spreading the first extrudate to the tire mold.

6. The assembly of claim 4 further comprising:
a heated friction shoe positioned near the nozzle and having a spread surface for use in spreading the first extrudate to the tire mold.

7. The assembly of claim 4 further comprising:
a roller shoe positioned near the nozzle and having a spread surface for use in spreading the first extrudate to the tire mold.

8. The assembly of claim 4 wherein:
the head comprises: (a) a fixed head portion; and, (b) a rotating head portion that is rotatable with respect to the fixed head portion; and,
wherein the nozzle is attached to the rotating head portion.

9. The assembly of claim 1 further comprising:
a second extruder operatively connected to the head; and,
the first extrudate comprising a tread base and a tread cap.

* * * * *